United States Patent [19]
Hsu et al.

[11] Patent Number: 5,870,843
[45] Date of Patent: Feb. 16, 1999

[54] MOTION GENERATING MECHANISM FOR A MUSIC BOX

[76] Inventors: Feng-Hsiang Hsu, 7th Floor, No. 9, Lane 100, Her Chiang Street, Taipei; Win-Hseng Laing, No. 49-3, Lane 163, San Her Road Sec. 4, San Chun City, Taipei Hsien; Ching-Fa Huang, 5 Fl., 7-1, Alley 56, Lane 166, Shih Pai Road Sec. 1, Taipei, all of Taiwan

[21] Appl. No.: 731,950

[22] Filed: Oct. 23, 1996

[51] Int. Cl.[6] .............................. G09F 19/08; G10F 1/06; F16H 21/40
[52] U.S. Cl. .................................. 40/411; 40/455; 74/48; 74/55; 74/567; 74/569; 84/95.2
[58] Field of Search ................. 74/48, 55, 567, 74/569; 40/411, 414, 415, 455; 84/95.2

[56] References Cited

U.S. PATENT DOCUMENTS

| | | | |
|---|---|---|---|
| 4,828,530 | 5/1989 | Lee | 446/354 |
| 5,070,753 | 12/1991 | Hou | 84/95.2 |
| 5,081,899 | 1/1992 | Hou et al. | 84/95.2 |
| 5,161,420 | 11/1992 | Feng | 74/53 |
| 5,255,461 | 10/1993 | Chiou | 40/415 |
| 5,412,889 | 5/1995 | Hou | 40/411 |
| 5,430,239 | 7/1995 | Chen | 84/95.2 |

*Primary Examiner*—Allan D. Herrmann
*Attorney, Agent, or Firm*—Browdy and Neimark

[57] ABSTRACT

An improved motion generating mechanism for use in a music box to drive decoration articles associated therewith is disclosed. A crank arm eccentrically attached to the outer side of the driving wheel associated with the playing roller of a music box is circularly moved in synchronism with the driving wheel. At each end of the crank arm is disposed an engagement protrusion respectively. A securing seat is fixed to the mounting plate of the music box and to the base plate of the outer case with a supporting base pivotally associated therewith respectively; each supporting base is provided with a swing arm having an elongated guide groove disposed thereon; in each groove is slidably located the engagement protrusion so that the supporting bases are able to be pivotally moved in synchronism with the crank arm. To each supporting base is secured a mounting pole onto which a decoration article is mounted. Each mounting pole is led through an elongated slot disposed on the top of an upper lid. An additional cam board is mounted to the crank arm with an abutment disc in urging contact therewith and an actuation pole attached to the abutment disc with a decoration article attached thereto is able to be actuated synchronically up and down.

11 Claims, 7 Drawing Sheets

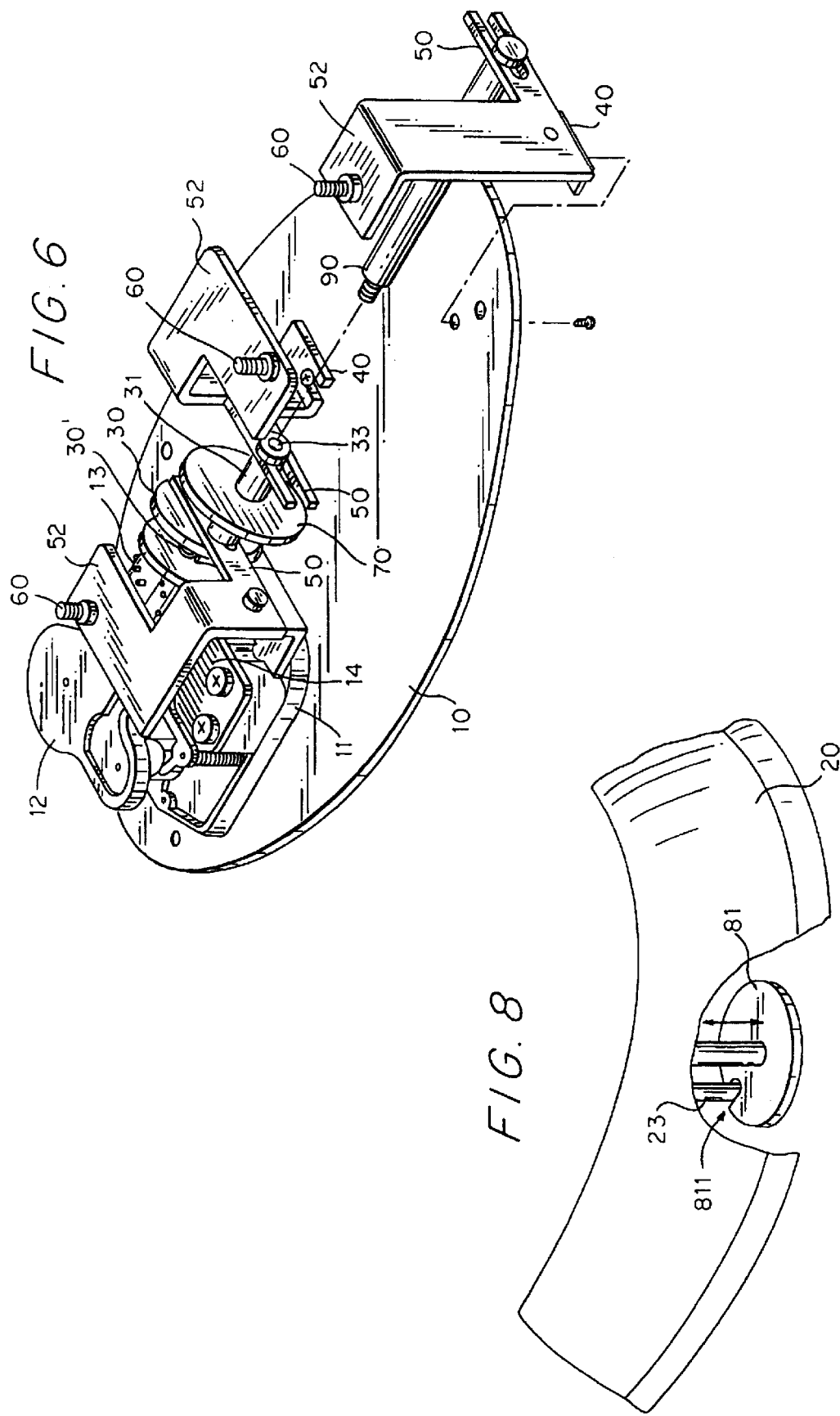

5,870,843

MOTION GENERATING MECHANISM FOR A MUSIC BOX

BACKGROUND OF THE INVENTION

The present invention relates to an improved motion generating mechanism for a music box which is comprised of a driving wheel associated with the playing roller of the music box; and a crank arm having a cam board mounted thereto and eccentrically secured to the driving wheel is provided with an engagement protrusion at each end thereof. A supporting base having a swing arm which is provided with an elongated guide groove is pivotally fixed to a securing seat mounted to the mounting plate of the music box and to the base plate of an outer case respectively. Each engagement protrusion of the crank arm is slidably engaged with the guide groove of each swing arm so that the rotation of the driving wheel will cause the crank arm to accordingly move, making the supporting bases to be pivotally operated in synchronism. To each supporting base is attached a mounting pole on which is disposed a decoration article whereby the motion of the crank arm can make the decoration articles to act in a fascinating manner. The cam board is in abutment against an abutment disc on which is disposed an actuation pole so as to make an decoration article attached thereto to move also in synchronism with the other decoration articles moved with the music played by the music box, making the motion of the decoration articles more interesting.

Referring to FIG. 1, a conventional music box having a mounting plate 11 is disposed on a base plate 10 of an outer case. A mounting pole 21 led through the upper lid 20 of the outer case is provided with a follower base 22 at the bottom end thereof. A spring tightening unit 12 mounted to the mounting plate of the music box is able to drive a playing roller 13 to move when tightened. There are a plurality of protrusion points disposed on the playing roller 13 which can actuate a plurality of music producing strips 14 having a different length to generate music.

As further shown in FIG. 2, a connection rod 15 having a driving wheel 16 eccentrically disposed at each end thereof that can make the follower base 22 disposed at the bottom end of the mounting pole 21 to be actuated up and down and circularly in synchronism with the played music so as to make the decoration articles dancingly moved in an interesting manner.

However, the simple structure of the prior art driving mechanism can only produce simple motion without too much variation, so it becomes less competitive in a fast changing consumer market.

To overcome the above cited problem, the present inventor has worked out an improved motion generating mechanism which can produce complex motions in synchronism with a played music.

SUMMARY OF THE INVENTION

Therefore, the primary object of the present invention is to provide an improved motion generating mechanism adapted for a music box which can produce complex motions for the attached decoration articles, i.e., an up and down motion along with swinging motion simultaneously.

Another object of the present invention is to provide an improved motion generating mechanism which is provided with a cam board that can be designed in various shapes so as to produce complex motions for the decoration articles mounted to the music box.

One further object of the present invention is to provide an improved motion generating mechanism which is equipped with an additional extension supporting base attached to the end of the crank arm of the present invention.

BRIEF DESCRIPTION OF THE DRAWINGS

FIG. 6 is a diagram showing an extension supporting base being able to be attached to the crank arm;

FIG. 8 is a diagram showing a different embodiment of the abutment disc of FIG. 4.

DETAILED DESCRIPTION OF THE PREFERRED EMBODIMENT

Figure 3:
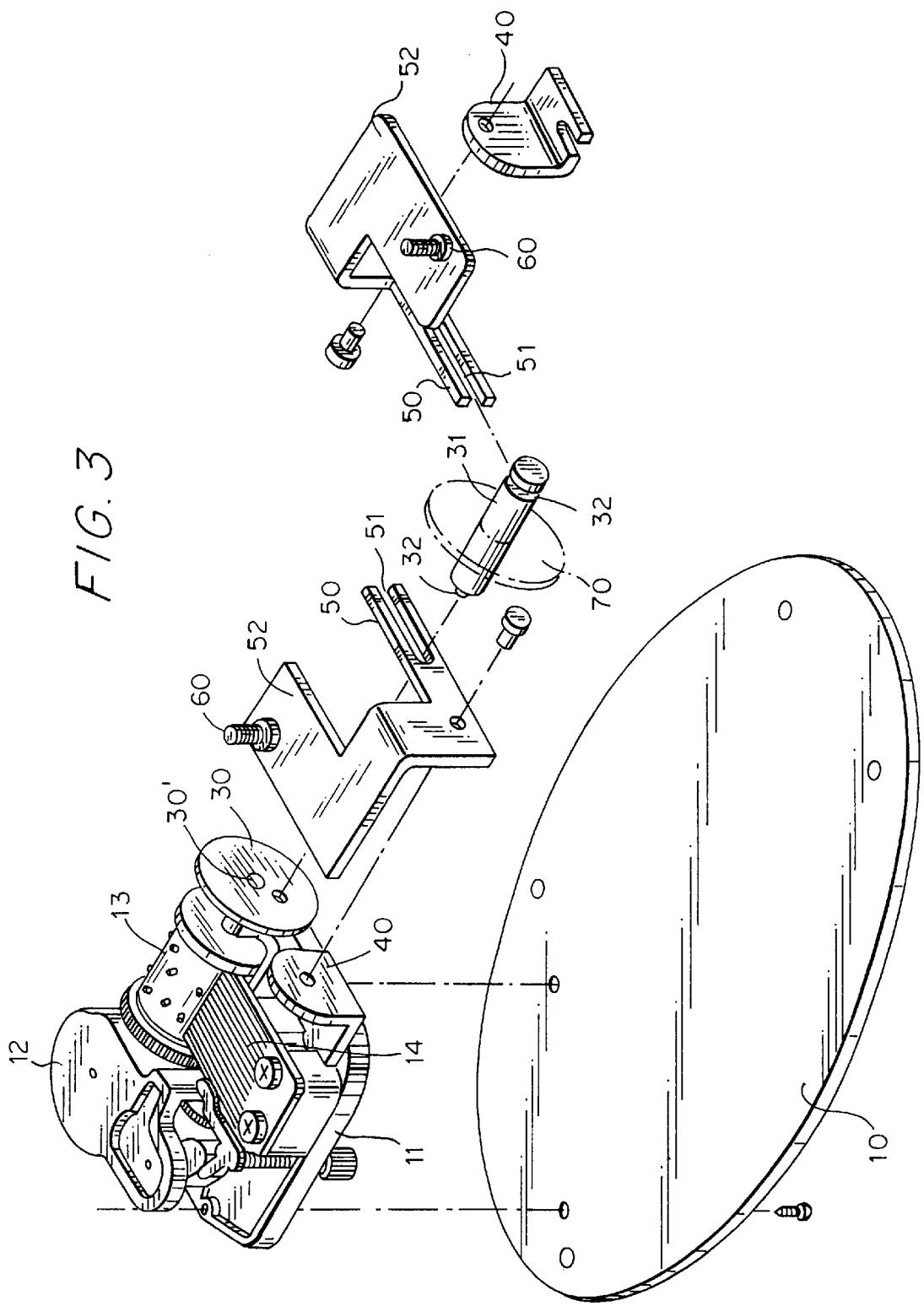
FIG. 3 is a perspective diagram showing the exploded components of the present invention.

Referring to FIG. 3, the motion generating mechanism of the present invention is explodedly shown. A music box having a mounting plate 11 is secured to a base plate 10 of an outer case. A spring tightening unit 12 secured to the mounting plate 11 of the music box is associated with a playing roller 13 which is provided with a plurality of point protrusions and is able to be driven by the wound spring tightening unit 12. A plurality of music producing strips each having a different length are in sequential abutment against the point protrusions on the rotating playing roller 13 so as to produce harmonic music as a result of the vibration of the music producing strips 14. To one side of the playing roller 13 of the music box is fixed with a driving wheel 30 which is rotated by driving rod 30' on roller 13. A crank arm 31 having an engagement slot 32 disposed at each end thereof is eccentrically and perpendicularly engaged with the driving wheel 30.

A securing seat 40 is fixed to the mounting plate 11 and to the base plate 10 respectively; they are spaced in such a manner that the crank arm 31 can be operationally fitted therebetween.

To each securing seat 40 is pivotally mounted a supporting base 52 having a swing arm 50 which is provided with an elongated guide groove 51. The elongated guide groove 51 is slidably engaged with each engagement slot 32 of the crank arm 31 so that the supporting base 52 can be pivotally moved when the driving wheel 30 is in rotation. To each supporting base 52 is secured a mounting pole 60 unto which is mounted a decoration article 61.

Figure 4:
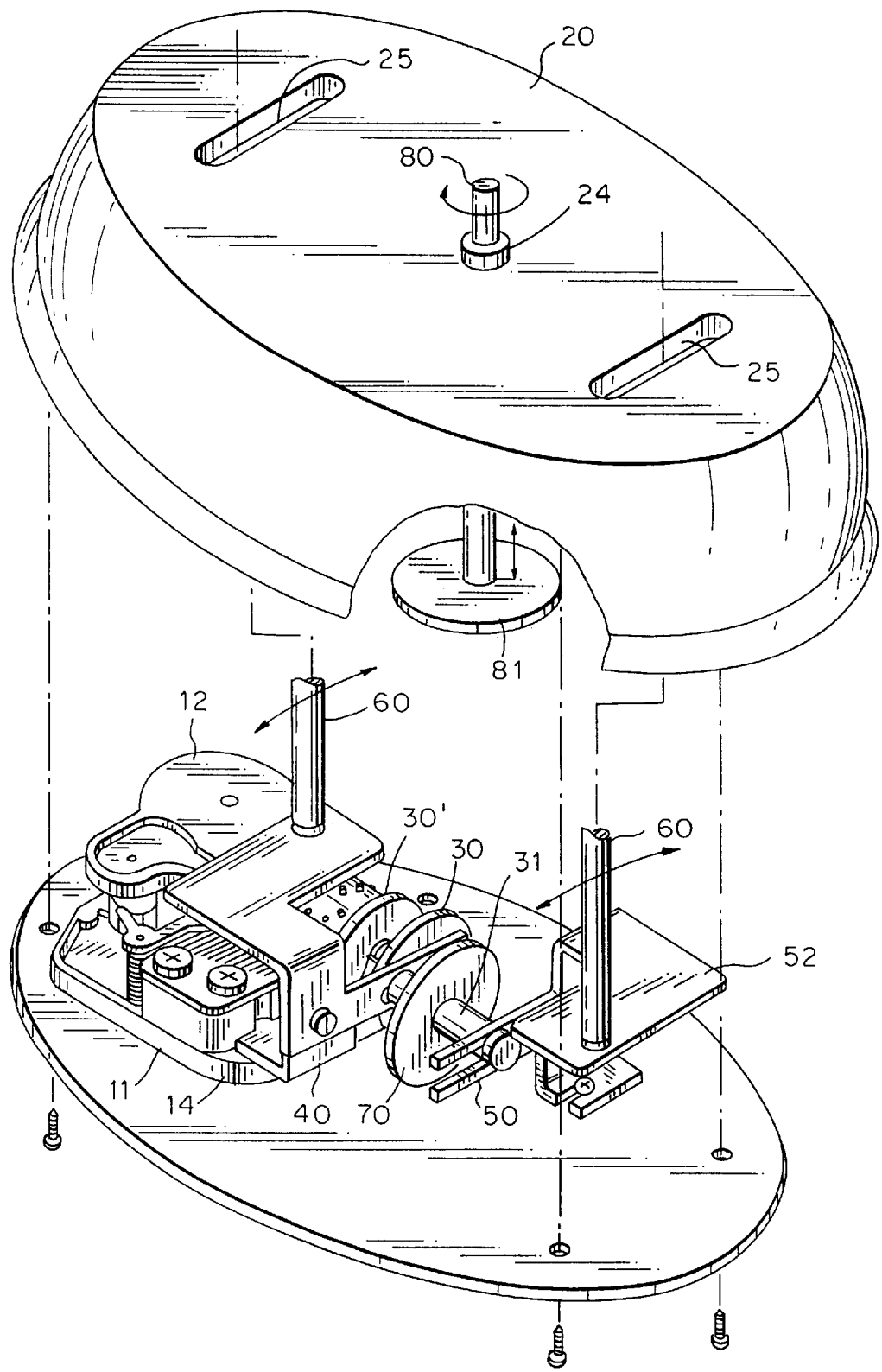
FIG. 4 is a diagram showing the assembled motion generating mechanism of the present invention.
Figure 5:
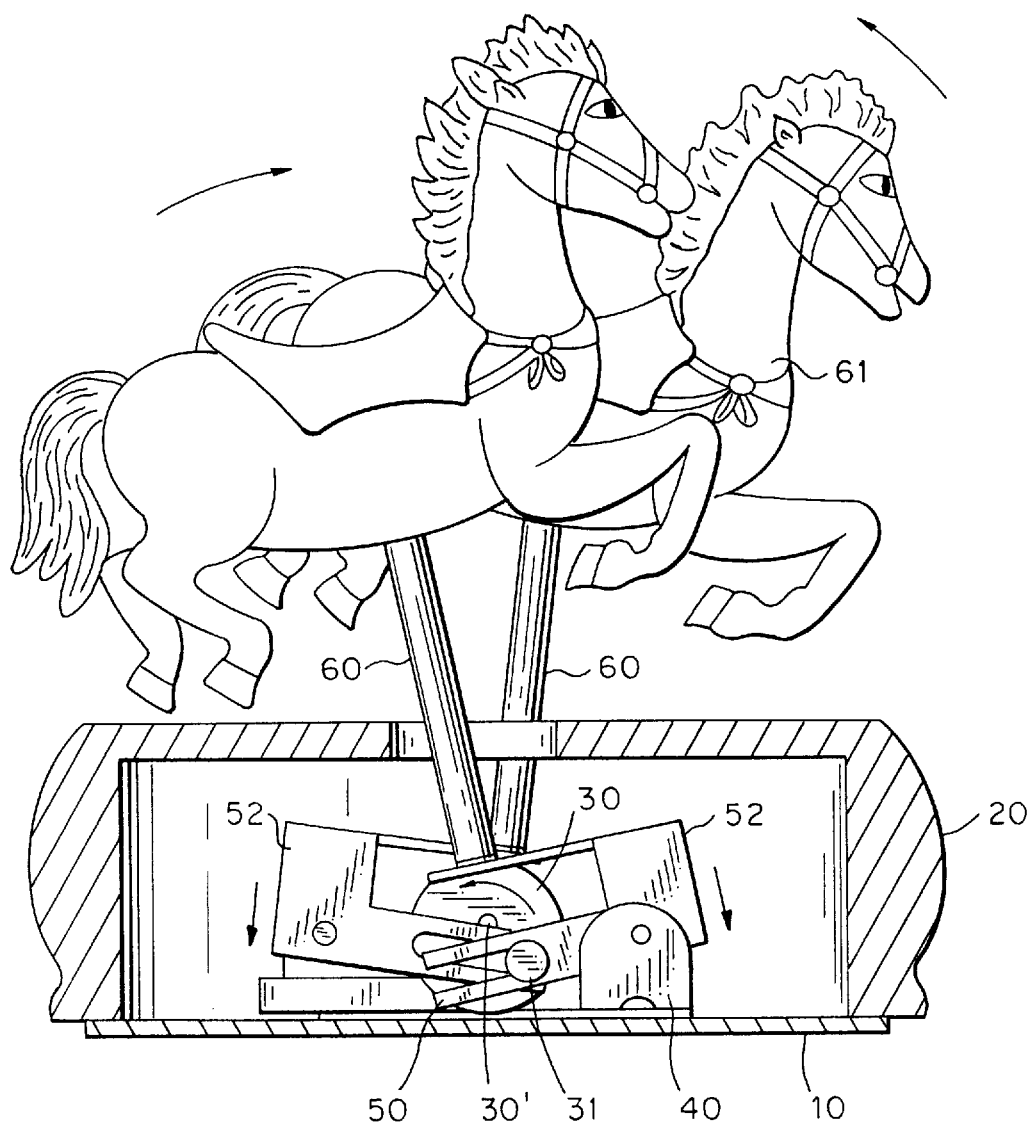
FIG. 5 is a sectional view of the present invention, showing the connection of the decoration articles to the motion generating mechanism.

Referring to FIGS. 4, 5, the mounting poles 60 led through the elongated slots 25 and an actuation pole 80 led via a through hole 24 disposed on the upper lid 20 of the outer case are attached with a decoration article 61 respectively so that the articles 61 can be sychronically moved by the driving wheel 30.

Figure 1:
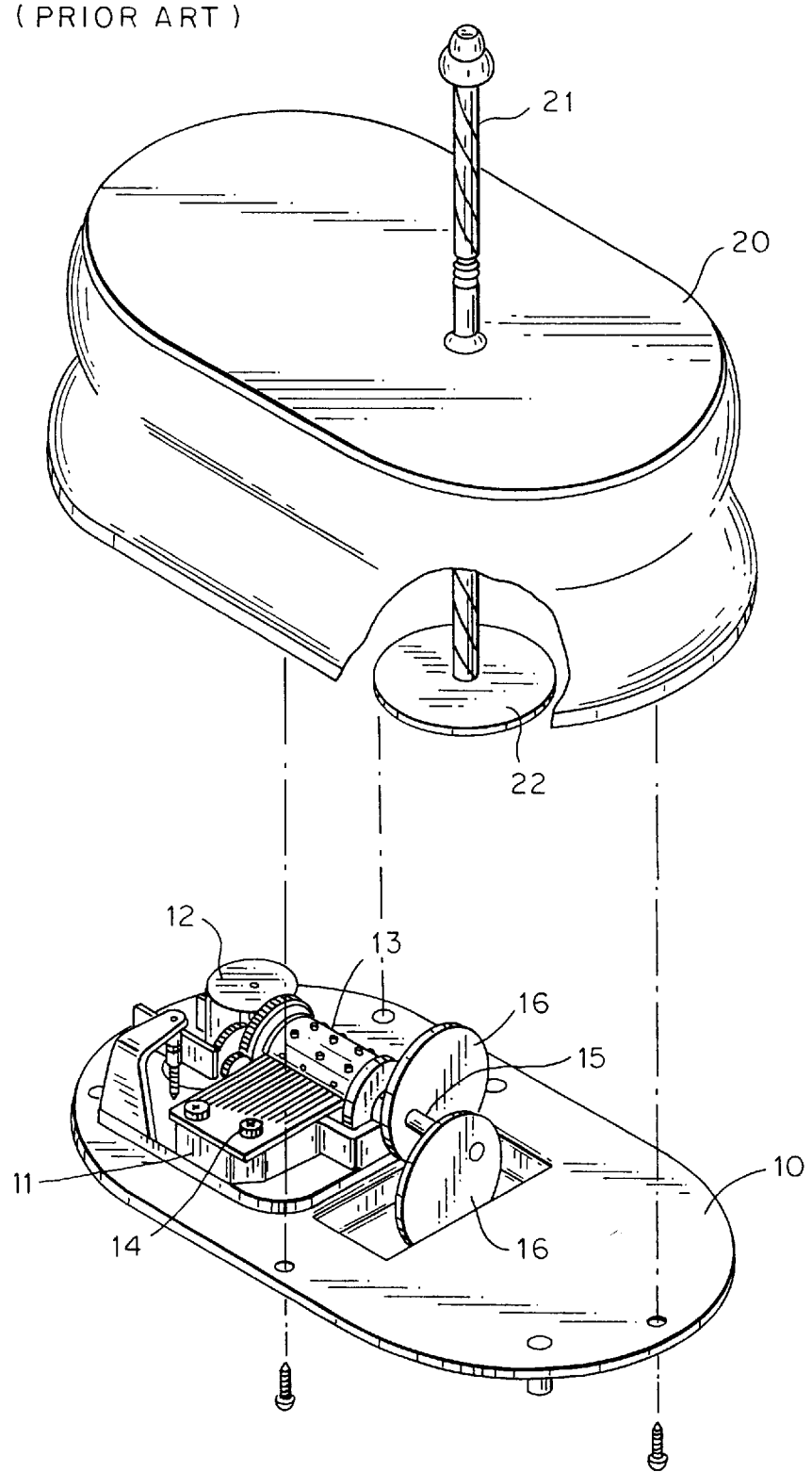
FIG. 1 is a diagram showing a prior art motion generating mechanism for a music box.
Figure 2:
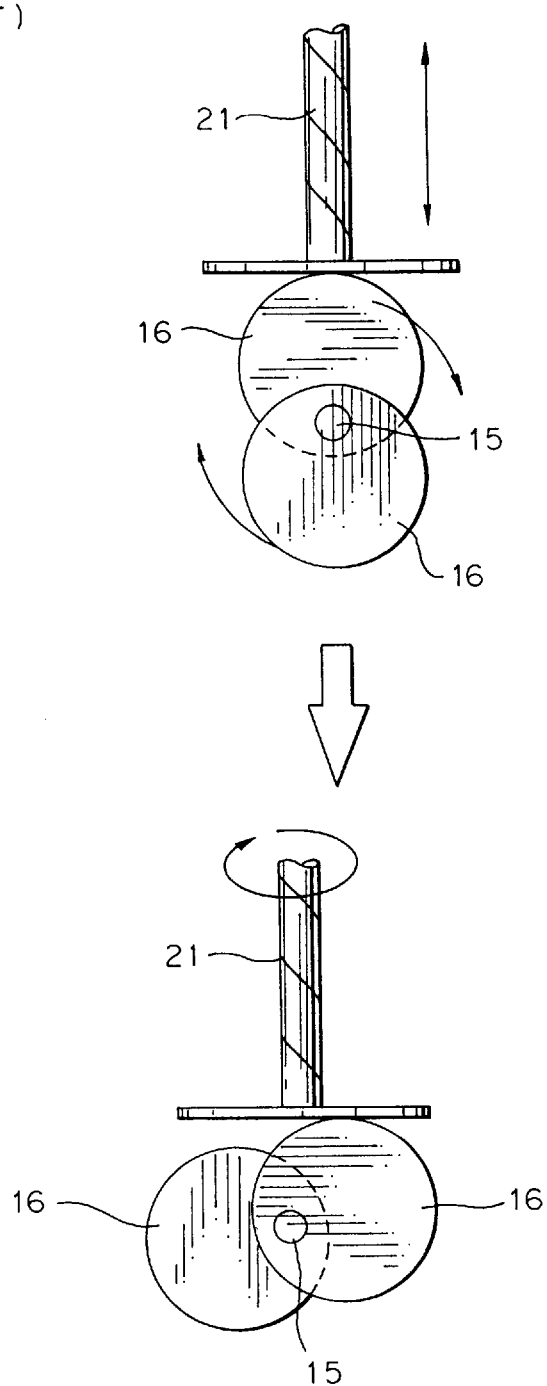
FIG. 2 is a diagram showing the details of motion of the prior art motion generating mechanism for a music box.

As shown in FIG. 4, a cam board 70 is attached to the crank arm 31 and is rotatably engaged against an abutment disc 81 disposed at the bottom of an actuation pole 80 so as to make the same move up and down and rotationally in synchronism with the driving wheel 30 in the same manner as the prior art device shown in FIG. 2 explained above. Furthermore as shown in FIG. 8, the abutment disc 81 can be provided with a lock recess 811, and a lock stick 23 fixed to the upper lid 20 which is engaged with the lock recess 811 so as to limit the abutment disc 81 to move only up and down when cam board 70 is rotated.

Referring to FIG. 6, another embodiment of the present invention is shown wherein the crank arm 31 is provided with a screw hole 33 at the end thereof so that an extension driving rod 90 can be screwed thereto. A third securing seat 40 can be fixed to the base plate 10 at such a position that a third supporting base 52 can be pivotally associated therewith with the end of the extension driving rod 90 engaged with the guide groove 51 of the swing arm 50 so that an extra mounting pole 60 having a decoration articles disposed thereon can be provided. So on so forth, additional extension driving rods can be set up in the same manner as long as the space is permitted of the extension. To each extension driving rod 90 a cam board 70 can be attached so that the actuation pole 80 having an abutment disc 81 disposed at the bottom thereof can be actuated to move up and down, permitting the motion generating mechanism to make complex and fascinating motions.

Figure 7A:
FIG. 7, inclusive of diagrams 7-A through 7-L, show various shapes of the cam board of the present invention.
Figure 7B:
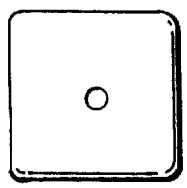
Figure 7C:
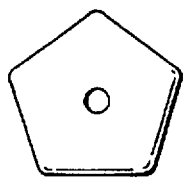
Figure 7D:
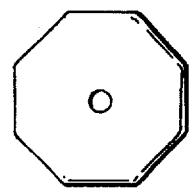
Figure 7E:
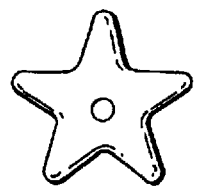
Figure 7F:
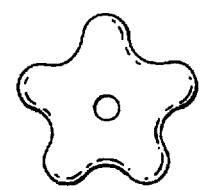
Figure 7G:
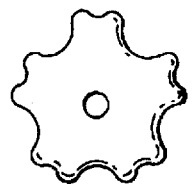
Figure 7H:
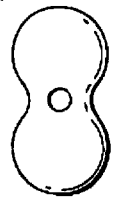
Figure 7I:
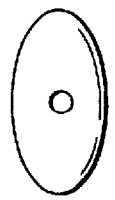
Figure 7J:
Figure 7K:
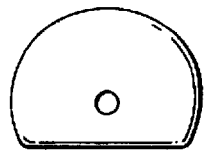
Figure 7L:
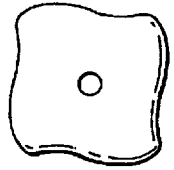

As further shown in FIG. 7, various cam boards 70 can be attached to the crank arm 31, for example, a triangular cam board as shown in FIG. 7A, a square cam board as shown in FIG. 7B, a 5-side square polygon as shown in FIG. 7C, an 8-side square polygon as shown in FIG. 7D; and an asterisk shaped as shown in FIG. 7E; and ✲ shaped as shown in FIG. 7F; and ✿ shaped as shown in FIG. 7G, and 8 shaped as shown in 7H, and an oval shaped cam board as shown in FIG. 7I, ⓐ and shaped cam board as shown in FIG. 7J; and a ⌓ shaped cam board as shown in Fig, 7K; and a ⌔ shaped cam board as shown in FIG. 7L. The above cited cam boards 70 of different shape enable the actuation pole 80 having an abutment disc 81 disposed at the bottom thereof to produce abundant complicated motions.

It can be clearly seen now that the motion generating mechanism of the present invention makes the decoration articles of a conventional music box to perform more complicated and fascinating motions as a result of adoption of pivotal supporting bases slidably engaged with an eccentrically located crank arm, and the addition of cam boards of different shape, and the extension driving rod.

I claim:

1. An improved motion generating mechanism adapted for a music box having a mounting plate on which is disposed a wound spring tightening means driving a playing roller on the surface of which are disposed a plurality of point protrusions which are so fixedly located in correspondence to a specific music that a plurality of music producing strips of different length can be sequentially actuated when said playing roller is spinned by said wound spring tightening means, producing a music;

said motion generating mechanism comprising:

a driving rod rotated by said wound spring tightening means, a driving wheel on said driving rod driven by said playing roller being provided with an eccentrically located crank arm which is moved in synchronism with said driving rod;

said crank arm being provided with an engagement slot at each end thereof;

a first securing seat fixed to said mounting plate of said music box and a second securing seat fixed to a base plate on which said mounting plate is fixed;

each of a pair of supporting bases having a swing arm which is provided with an elongated guide groove thereon, each said engagement slot of said crank arm slidably located respectively in each said elongated guide groove; each of said pair of supporting bases being pivotally fixed respectively to said first securing seat and said second securing seat so that the rotation of said driving rod can make said supporting bases swing in synchronism;

an upper lid fixed to said base plate provided with a pair of elongated slots;

a mounting pole being attached to each of said supporting bases;

each mounting pole respectively extending through one of said pair of elongated slots with a decoration article mounted thereto.

2. An improved motion generating mechanism as claimed in claim 1 wherein said crank arm is provided with a screw hole at one end thereof so that an additional extension to said driving rod can be screwed thereto; and a third securing seat can be fixed to said base plate at such a position that a third supporting base can be pivotally associated therewith with a free end of said additional extension to said driving rod engaged with a guide groove of a swing arm of said third supporting base on which is disposed a decoration article; wherein said extension can be continually added to said motion generating mechanism as the space is permitted.

3. An improved motion generating mechanism as claimed in claim 1 wherein said crank arm can be provided with a cam board which is rotatingly engaged against an abutment disc disposed at the bottom of an actuation pole slidably and rotatably mounted on said lid so that said cam board can actuate said actuation pole to move up and down and rotationally when said crank arm is in operation.

4. An improved motion generating mechanism as claimed in claim 3 wherein said abutment disc is provided with a lock recess which can be in engagement with a stop stick so as to limit said actuation pole to move only up and down without rotation.

5. An improved motion generating mechanism as claimed in claim 3 wherein said cam board is of a triangular shape.

6. An improved motion generating mechanism as claimed in claim 3 wherein said cam board is of a square shape.

7. An improved motion generating mechanism as claimed in claim 3 wherein said cam board is of a 5-side polygon.

8. An improved motion generating mechanism as claimed in claim 3 wherein said cam board is of an 8-side polygon.

9. An improved motion generating mechanism as claimed in claim 3 wherein said cam board is of an asterisk shape.

10. An improved motion generating mechanism as claimed in claim 3 wherein said cam board is of 8 shape.

11. An improved motion generating mechanism as claimed in claim 3 wherein said cam board is of an oval shape.

* * * * *